United States Patent [19]

Tabei et al.

[11] 4,388,400

[45] Jun. 14, 1983

[54] HEAT-MODE RECORDING MATERIAL

[75] Inventors: Masatoshi Tabei; Minoru Wada; Yonosuke Takahashi; Satoshi Yoshida, all of Asaka, Japan

[73] Assignee: Fuji Photo Film Co., Ltd., Kanagawa, Japan

[21] Appl. No.: 309,143

[22] Filed: Oct. 6, 1981

[30] Foreign Application Priority Data

Oct. 6, 1980 [JP] Japan .................................. 55-139687

[51] Int. Cl.³ .......................... G03C 1/76; G03C 5/04
[52] U.S. Cl. .................................... 430/346; 430/348; 430/495; 430/496; 430/524; 430/945; 346/135.1; 428/209; 428/913
[58] Field of Search .................... 346/135.1; 430/945, 430/524, 495, 496, 346, 348, 330; 428/209, 913

[56] References Cited

U.S. PATENT DOCUMENTS

| | | | |
|---|---|---|---|
| 3,533,786 | 10/1970 | Looker | 430/70 |
| 3,560,994 | 2/1971 | Wolff et al. | 430/524 |
| 3,898,672 | 8/1975 | Yasumori et al. | 346/135.1 |
| 3,955,013 | 5/1976 | Kivlighn | 430/945 |
| 4,024,546 | 5/1977 | Brill et al. | 346/135.1 |
| 4,188,214 | 2/1980 | Kido et al. | 430/945 |
| 4,217,374 | 8/1980 | Ovshinsky et al. | 427/74 |
| 4,230,939 | 10/1980 | de Bont et al. | 430/945 |
| 4,252,678 | 2/1981 | Smith | 430/945 |
| 4,265,991 | 5/1981 | Hirai et al. | 430/84 |

*Primary Examiner*—Mary F. Downey
*Attorney, Agent, or Firm*—Sughrue, Mion, Zinn, Macpeak and Seas

[57] ABSTRACT

A heat-mode recording material is disclosed. The material comprises a base which is overlaid with a recording layer made of a metal, semimetal or semiconductor containing at least hydrogen.

23 Claims, No Drawings

HEAT-MODE RECORDING MATERIAL

FIELD OF THE INVENTION

This invention relates to a heat-mode recording material that records information using a light beam of high energy density.

BACKGROUND OF THE INVENTION

Silver salts and other photosensitive materials are used as a recording material that uses laser and other forms of light beams of high energy density. A thermal recording material is also used as such material. The recording layer of the thermal recording material has high optical density.

When it absorbs a light beam of high energy density, the local temperature increases causing thermal deformation such as melting, evaporation or aggregation to remove the irradiated area, whereupon a difference in optical density from the non-irradiated area is produced to achieve the recording of information. This thermal recording material has the following advantages: Photographic processing such as development or fixation is generally unnecessary; processing in a dark room is unnecessary since no information is recorded by ordinary indoor light; a high-contrast image is produced; additional recording (add-on recording) of information is possible.

In most cases, information is recorded on the thermal recording material by converting it to electrical signals in time sequence and scanning the recording material with a laser beam modulated according to the signals. One advantage of this recording mode is that a recorded image can be obtained on a real-time basis.

The recording layer of the thermal recording material may generally be made of cheap materials such as metal, dye and plastic. Thermal recording materials are described in, say, M. L. Levene et al., proceedings of 11th "Electron, Ion and Laser Beam Technology" Symposium, 1969; "Electronics", Mar. 18, 1968, p. 50; D. Maydan, "The Bell System Technical Journal", 50, 1971, p. 1761; and C. O. Carlson, "Science", 154, 1966, p. 1550. Thermal recording materials wherein the recording layer is made of metals comprise a thin film of Bi, Sn, In, etc. on a base, have desirable properties for thermal recording such as production of a high-resolution and high-contrast image. However, many recording materials using thin metal films reflect at least 50% of the laser beam and fail to use its energy effectively. Therefore, they require light of great energy for recording, and in order to record by high-speed scanning, a powerful laser beam source is necessary. This requires the use of large-scale expensive recording equipment. Several high-sensitivity recording materials have been studied. One example which consists of three layers of Se, Bi and Ge is described in U.S. Pat. No. 3,560,994. The recording material disclosed in this patent has a very thin Ge film that is formed on thin Se and Bi films to reduce their light reflectance. But the addition of Se is not desired since it presents pollution hazards. In addition, the quality of the image recorded by this material is not satisfactory.

Japanese Patent Application (OPI) No. 74632/76 (the symbol OPI as used herein means an unexamined published Japanese patent application) describes a recording material wherein an anti-reflection layer that absorbs light in the range of the wavelength of the laser beam used for recording is formed on a metal layer. However, it is very difficult to eliminate light reflection entirely by an anti-reflection layer. Even if it is possible to completely eliminate light reflection, a powerful laser beam source is still necessary for producing thermal deformations such as fusion, evaporation and aggregation by exposure to a laser beam. Therefore, a recording material of even higher sensitivity has been desired.

SUMMARY OF THE INVENTION

One object of this invention is to provide a high-sensitivity heat-mode recording material suitable for recording by laser and other forms of high energy density light beams.

Another object of this invention is to provide a high-sensitivity heat-mode recording material that produces a high-quality image.

These objects of this invention can be achieved by a heat-mode recording material wherein a base has formed thereon a recording layer made of a metal, semimetal or semiconductor which contains hydrogen.

DETAILED DESCRIPTION OF THE INVENTION

In one embodiment, the high-sensitivity recording material of this invention has a hydrogen-containing metal, semimetal or semiconductor layer formed on a base. In another embodiment, the hydrogen-containing metal, semimetal or semiconductor layer is overlaid with an anti-reflection layer or protective layer made of an inorganic or organic material.

The base used in this invention may be made of materials commonly employed as base materials such as a plastic (e.g. polyethylene terephthalate), glass, paper, and metal sheet or foil. When a metal sheet or foil is used as the base, a thermally and electrically insulating layer of organic polymer or inorganic material such as a ceramic, titanium dioxide, magnesium oxide, etc. is preferably provided between the metal base and the recording layer so as to reduce thermal loss due to such an electrically conductive base, which is generally highly heat-conductive.

The metal, semimetal or semiconductor layer used in this invention (hereinafter referred to as a "metal layer") is made of one or more elements selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Tl, Pb, Po, Sn, As, Sb, Bi, Se and Te. The elements suitable for use in this invention desirably meet the following requirements: (1) hydrogen remains stable in them; (2) they have little toxicity; (3) they require little energy for melting or evaporation; (4) they have low light reflectance; (5) they undergo little change in their characteristics, say, optical density, during storage; (6) in combination with hydrogen, they easily undergo thermal deformations such as melting, evaporation and aggregation upon thermal or photochemical activation; and (7) they can be easily shaped into a film. Preferred elements that are most effective for purposes of this invention are Zn, In, Sn, Ge, Mg, Ni, Fe, Al and Ga.

When the metal layer is made of an alloy, it may contain Na, K or Ca. These metals are formed on a base using various methods such as vacuum deposition, sputtering, ion plating, chemical vapor deposition (CVD), glow discharge decomposition, electro plating, and electroless plating, with the chemical vapor deposition method being preferably applied. A layer made of two or more metals may be formed by vacuum deposition of alloys, or by depositing two or more metals from separate evaporation sources simultaneously or separately. When two or more metal layers are formed, at least one of them must contain hydrogen. The metal layer may have a thickness that provides an optical density necessary for a desired image. For providing a transmission density of 2, a metal layer having a thickness of 300 to 1500 Å is necessary, but it is to be understood that the exact thickness varies with the type of metal used. It is also to be understood that when the metal layer is formed on a base by vacuum deposition, sputtering, ion plating, CVD, glow discharge decomposition, etc., the structure of the resulting metal layer varies with the type of base, temperature, degree of vacuum, deposition rate, etc., and that therefore, the layer thickness necessary for attaining the desired optical density also varies.

There are two methods of incorporating hydrogen in the metal layer. One is to incorporate hydrogen as the metal layer is being formed. The other is to supply hydrogen after the metal layer is formed. In the first method, hydrogen gas either alone or diluted with inert gas is supplied to a reactor where vacuum deposition, ion plating, sputtering, CVD, or the like is being carried out, and discharge energy or other means is used to incorporate hydrogen in the metal film being formed. When hydrogen gas is replaced by the gas of a hydrogenated metal compound such as $GeH_4$ or $SnH_4$, the hydrogenated metal is decomposed by glow discharge to form a metal layer containing hydrogen. In the second method wherein hydrogen is incorporated in a metal layer as it is formed, the metal layer is exposed to pressurized hydrogen in a sealed vessel. This method is particularly effective when the metal is Mg-Ni alloy or Fe-Ni alloy.

Hydrogen must be contained in the metal layer in an amount greater than that below which brittle fracture is not accelerated, i.e. a minimum level that accelerates brittle fracture, and this level varies with factors such as the type of metal or alloy used. Usually, the lower limit of hydrogen content is 0.01 atomic percent, preferably 1 atomic percent. The upper limit of hydrogen content is such that hydrogen remains stable at room temperature, and generally about 50 atomic percent. For example, hydrogenated germanium may contain as much as 20 to 30 atomic percent of hydrogen.

In this invention, the hydrogen-containing metal layer is irradiated with a laser beam to generate hydrogen, so a layer having an oxidizing effect formed adjacent the metal layer is effective for achieving higher sensitivity. Example of substances that have an oxidizing effect include inorganic or organic peroxides such as barium peroxide and benzoyl peroxide, halogenic acid salts such as potassium bromate and potassium iodate; and persulfate salts such as sodium persulfate. The layer having an oxidizing effect can be formed by vacuum deposition or by spreading a dispersion in a water-soluble binder such as polyvinyl alcohol. Instead of these conventional oxidizing agents, a self-oxidizing binder of the type described, for example, in Japanese Patent Application (OPI) No. 43632/73 may effectively be formed adjacent the recording layer. Nitrocellulose or its derivatives are used with advantage as the self-oxidizing binder.

In an embodiment of this invention, formation of an anti-reflection layer and/or protective layer on the recording layer made of the hydrogen-containing metal layer is effective for providing a recording material having increased sensitivity, durability, and mechanical atrength, as well as reduced time-dependent change in properties. The protective layer may be made of either an inorganic or organic substance provided that the substance transmits the high energy density light beam used, has good mechanical strength, does not react with the recording layer easily, can form a thin film, and can be manufactured easily.

The anti-reflection layer and/or protective layer used in this invention may be made of either an inorganic or organic substance. Illustrative inorganic substances for incorporation in the anti-reflection layer include SnS, GeS, Se, ZnS, $Sb_2S_3$, $In_2S_3$, $PbX_2$, CuX, AgX, KX, $CaX_2$, $SnX_2$ and $FeX_3$ (X being a halogen). Desirable inorganic substances for use in the protective layer are transparent substances such as $Al_2O_3$, $SiO_2$ SiO, MgO, ZnO, $TiO_2$, $ZrO_2$, $MgF_2$ and $CuF_2$. The anti-reflection layer and/or protective layer is formed by reactive vapor deposition techniques such as vacuum deposition, sputtering and ion plating.

It is effective to use organic substances to form a protective layer. Various resins can be used to form a protective layer, such as styrene resins (e.g. polystyrene and styrene/maleic anhydride resin), vinyl acetate resins (e.g. polyvinyl acetate, polyvinyl alcohol, polyvinyl butyral and polyvinyl formal), methacrylic acid ester resins (e.g. isobutyl polymethacrylate and methyl polymethacrylate), amide resins (e.g. polydiacetone acrylamide and polyacrylamide), cellulosic resins (e.g., ethyl cellulose, cellulose acetate butyrate, cellulose nitrate and diacetyl cellulose), halogenated polyolefins (polyvinyl chloride and chlorinated polyethylene), phenolic resins, soluble polyesters, soluble nylons, gelatin and copolymers thereof.

These resins are dissolved in solvents and spread by any known method. A wide variety of solvents can be used, such as acetone, methyl ethyl ketone, methyl isobutyl ketone, methyl cellosolve, ethyl cellosolve, butyl cellosolve, methyl cellosolve acetate, ethyl cellosolve acetate, butyl cellosolve acetate, hexane, cyclohexane, ethyl chloride, methyl chloride, benzene, chlorobenzene, methanol, ethanol, butanol, petroleum ether, dimethylformamide, and thinner. A suitable solvent may be selected depending on the type of resin.

These resins may contain a pigment, matting agent, plasticizer, lubricant and other additives depending on the object. The addition of about 0.1 to 10 wt% of a lubricant such as a higher aliphatic acid having at least 11 carbon atoms or an acid amide is effective for providing a recording material of high film strength. The lubricant such as the higher aliphatic acid or acid amide defined above may be spread on the protective layer by a conventional method in a thickness of 0.001 to 1 $\mu$m.

The thickness of the protective layer varies with the film strength, resistance to time-dependent change and recording density required for the recording material, and a thickness between 0.01 and 5 $\mu$m. is preferred. In still another embodiment, an air gap may be formed between the recording layer and protective layer.

The heat-mode recording material of this invention is imagewise exposed to high intensity radiation to thermally deform or change the recording layer, whereupon a difference in optical density from a non-irradiated area is produced to achieve the recording of information.

The recording material of this invention can be used as a substitute for a lithographic printing film, recording material for facsimile, optical disc, photomask for IC fabrication, recording material for microfilm, and for many other purposes.

This invention is now described in greater detail by reference to the following examples which are given here for illustrative purposes only and are by no means intended to limit the scope of the invention.

EXAMPLE 1

A parallel-plate sputtering apparatus (SPE-332 of Nichiden Varian Co., Ltd.) was revamped so that a 25 cm$\phi$ (cm diameter) grid (made of 100-wire stainless steel screen) faced opposite a 25 cm$\phi$ stainless steel substrate holder. The distance between the grid and holder was adjusted to 10 cm. A polyethylene terephthalate film (17 cm square, 100 $\mu$m thick) was adhered to the holder with an adhesive tape. After evacuation to less than $10^{-6}$ Torr, the chamber was fed with a mixture of germane produced by Japan Oxygen Co., Ltd. and hydrogen (germane content; 21.6%) through a channel that consisted of a regulating value (1301p of Japan Oxygen Co., Ltd.), a gas flow meter (Ueshima Prooks Tube R-2-15-D of Nippon Tokushy-gas K.K.), a stop valve and a ¼ in stainless steel pipe. The pressure in the chamber was adjusted to 0.2 Torr. Discharge was generated by applying high-frequency power (13.56 MHz) to the grid (travelling wave: 35 W, reflected wave: 5 W, difference: 30 W). The holder was maintained at room temperature. As a result of a 15-minute discharge, a nitrocellulose deposition and a thin, amorphous hydrogenated germanium film (ca. 0.3 $\mu$m) were formed on the polyethylene terephthalate film. The resulting recording material had an optical density of about 1.5 for white light. The germanium film was dark brown and it contained about 3 atomic percent of hydrogen. The 5145 Å beam of an argon ion laser was focused on the germanium film. The diameter of the focused laser beam was 25 $\mu$m, and its power was varied between 200 mW and 400 mW. The scanning speed was 18.8 m/sec. The germanium film became transparent at the irradiated areas at 250 mW. After reflectance correction, the sensitivity was found to be 160 mW. The energy density for this sensitivity was 0.17 J/cm$^3$. At 200 mW, a slightly reddish black image was formed. When a hydrogen-free germanium layer was used, the germanium film became transparent only when the film thickness was 800 Å (optical density: 1.54) and a power of 350 mW was applied. The sensitivity after reflectance correction was only 210 mW. The effect of hydrogen in providing higher sensitivity was clear.

EXAMPLE 2

An amorphous hydrogenated germanium film 0.3 $\mu$m thick was formed by repeating the procedure of Example 1 except that the polyethylene terephthalate film was replaced by a glass plate (2 cm×2 cm×0.8 mm) produced by Corning Glass Works as Corning 7059. The 5145 Å beam of an argon ion laser was focused on the film, and the image produced had the same characteristics as that obtained in Example 1.

EXAMPLE 3

After forming a nitrocellulose deposition on a polyethylene terephthalate film 100 $\mu$m thick, co-deposition of Sn and SnS was performed in vacuum ($2\times10^{-5}$ Torr) by supplying Sn and SnS from separate evaporation sources in controlled amounts. The resulting Sn-SnS film was partly covered with a glass sheet and installed in the chamber of a CVD apparatus (PED 303 of Nichiden Varian Co., Ltd.) in such a manner that it was exposed to an ion plasma, and after evacuation to $5\times10^{-6}$ Torr, the chamber was fed with 400 cc/min of hydrogen. A discharge was generated for 10 minutes by supplying high-frequency power (13.56 MHz, 200 W) through the high-frequency coil. During the discharge, the pressure in the chamber was held at 2 Torr. The resulting film was removed from the chamber and irradiated with laser as in Example 1. Upon irradiation with 175 mW of laser beam, the area treated with hydrogen plasma became highly transparent at the irradiated portion as compared to the area covered with the glass sheet. The effect of hydrogen plasma in achieving higher sensitivity was clear.

While the invention has been described in detail and with reference to specific embodiments thereof, it will be apparent to one skilled in the art that various changes and modifications can be made therein without departing from the spirit and the scope thereof.

What is claimed is:

1. A heat-mode recording material for recording information by imagewise exposure to high intensity radiation, which comprises a base support having thereon a recording layer capable of thermal deformation at the irradiated areas to cause a difference in optical density between the irradiated areas and the non-irradiated areas, said recording layer being a hydrogen-containing layer comprised of one or more elemental metals selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Tl, Pb, Po, Sn, As, Sb, Bi, Se and Te, wherein the hydrogen is introduced in the elemental metal layer to increase heat-sensitivity of the elemental metal layer.

2. A heat-mode recording material as claimed in claim 1, wherein said elemental metal is selected from the group consisting of Zn, In, Sn, Ge, Ni, Fe, Al, Mg, and Ga.

3. A heat-mode recording material as claimed in claim 1, further comprising a layer having a self-oxidizing binding effect formed adjacent to the recording layer.

4. A heat-mode recording material as claimed in claim 3, wherein the layer having self-oxidizing binding effect is comprised of nitrocellulose or a derivative thereof.

5. A heat-mode recording material as claimed in claim 1, further comprising a layer containing an oxidizing agent adjacent the recording layer.

6. A heat-mode recording material as claimed in claim 1, further comprising a thermally and electrically insulating layer formed between the base support and the recording layer.

7. A heat-mode recording material as claimed in claim 1, wherein said hydrogen is contained in an amount of 0.01 atomic % or more.

8. A heat-mode recording material as claimed in claim 7, wherein said hydrogen is contained in an amount of 1.0 atomic % or more.

9. A heat-mode recording material as claimed in claim 1, wherein said hydrogen is incorporated into said recording layer as said recording layer is formed.

10. A heat-mode recording material as claimed in claim 1, wherein said hydrogen is incorporated into said recording layer after said recording layer is formed.

11. A heat-mode recording layer as claimed in claim 1, wherein said recording layer is free of an organic binder.

12. A process of recording information on a heat-mode recording material comprising a base support having thereon a recording layer which is a hydrogen-containing layer of one or more elemental metals selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Tl, Pb, Po, Sn, As, Sb, Bi, Se and Te, wherein the hydrogen is introduced in the elemental metal layer to increase heat-sensitivity of the elemental metal layer, which process comprises imagewise exposing said recording material to high intensity radiation to thermally deform the recording layer, whereby a difference in optical density is produced between the irradiated areas and the nonirradiated areas.

13. A heat-mode process as claimed in claim 12 wherein said elemental metal is selected from the group consisting of Zn, In, Sn, Ge, Ni, Fe, Al, Mg and Ga.

14. A process as claimed in claim 12 wherein said recording material further comprises a layer having a self-oxidizing binding effect formed adjacent to the recording layer.

15. A process as claimed in claim 14, wherein the layer having a self-oxidizing binding effect is comprised of nitrocellulose or a derivative thereof.

16. A process as claimed in claim 12, wherein the recording material further comprises a layer containing an oxidizing agent adjacent the recording layer.

17. A process as claimed in claim 12, wherein the recording material further comprises a thermally and electrically insulating layer formed between the base support and the recording layer.

18. A process as claimed in claim 12, wherein said hydrogen is contained in an amount of 0.01 atomic % or more.

19. A process as claimed in claim 18, wherein said hydrogen is contained in an amount of 1.0 atomic % or more.

20. A process as claimed in claim 12, wherein the recording layer has a thickness of about 0.03 to 0.3 $\mu$m.

21. A process as claimed in claim 12, wherein said hydrogen is incorporated into said recording layer as said recording layer is formed.

22. A process as claimed in claim 12, wherein said hydrogen is incorporated after said recording layer is formed.

23. A process as claimed in claim 12, wherein said recording layer is free of an organic binder.

* * * * *